US012676536B2

(12) United States Patent
Kawakami

(10) Patent No.: US 12,676,536 B2
(45) Date of Patent: Jul. 7, 2026

(54) STATOR AND STATOR SEALING METHOD

(71) Applicant: TOYOTA JIDOSHA KABUSHIKI KAISHA, Toyota (JP)

(72) Inventor: Jun Kawakami, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 383 days.

(21) Appl. No.: 18/188,913

(22) Filed: Mar. 23, 2023

(65) Prior Publication Data

US 2023/0308000 A1    Sep. 28, 2023

(30) Foreign Application Priority Data

Mar. 28, 2022    (JP) ................................. 2022-052601

(51) Int. Cl.
| | |
|---|---|
| *H02K 15/12* | (2025.01) |
| *H02K 1/16* | (2006.01) |
| *H02K 3/48* | (2006.01) |
| *H02K 15/02* | (2025.01) |

(52) U.S. Cl.
CPC .............. *H02K 15/12* (2013.01); *H02K 1/16* (2013.01); *H02K 3/48* (2013.01); *H02K 15/02* (2013.01)

(58) Field of Classification Search
CPC .......... H02K 1/16; H02K 15/02; H02K 15/12; H02K 3/34; H02K 3/48
See application file for complete search history.

(56) References Cited

U.S. PATENT DOCUMENTS

| | | | | |
|---|---|---|---|---|
| 2013/0285481 A1* | 10/2013 | Satou | ..................... | H02K 15/14 |
| | | | | 310/43 |
| 2014/0333158 A1* | 11/2014 | Tamaki | .................... | H02K 5/08 |
| | | | | 310/43 |
| 2015/0256055 A1* | 9/2015 | Kino | ................. | B29C 45/14467 |
| | | | | 264/261 |
| 2024/0171018 A1* | 5/2024 | Nakano | .................... | H02K 1/18 |
| 2024/0283320 A1* | 8/2024 | Hosoya | ................. | H02K 1/145 |

FOREIGN PATENT DOCUMENTS

| | | | |
|---|---|---|---|
| JP | H07-123342 B2 | 12/1995 | |
| JP | 2008-178163 A | 7/2008 | |
| JP | 2008-260190 A | 10/2008 | |
| JP | 2010-142075 A | 6/2010 | |
| JP | 2011-259566 A | 12/2011 | |
| JP | 2013-110794 A | 6/2013 | |
| JP | 2019-122250 A | 7/2019 | |
| WO | 2019/039204 A1 | 2/2019 | |
| WO | WO-2019131915 A1 * | 7/2019 | ............... H02K 3/46 |

\* cited by examiner

*Primary Examiner* — Christopher M Koehler
*Assistant Examiner* — Ethan Nguyen Vo
(74) *Attorney, Agent, or Firm* — Sughrue Mion, PLLC

(57) ABSTRACT

A stator comprises a cylindrical stator core centered on an axis, a coil arranged wound around a tooth disposed on the stator core, the tooth protrudes to one side in radial direction of the stator core, and the stator comprises a resin portion sealing up each of the stator core and the coil, the resin portion has a gate mark that lies on one side with respect to the coil in the radial direction of the stator core, the gate mark lies on outer side with respect to an end face of the stator core in the axial direction, the gate mark overlaps in position with the coil in the radial direction of the stator core.

6 Claims, 6 Drawing Sheets

FIG.1

START (PLACEMENT PROCESS)

PLACE STATOR CORE, COILS,
AND INSULATING MEMBER
WITHIN CAVITY OF MOLD (INJECTION PROCESS)

INJECT SEALING RESIN MATERIAL
FROM GATE INTO CAVITY (CURING PROCESS)

CURE SEALING RESIN MATERIAL (REMOVAL PROCESS)

REMOVE MOLDED PRODUCT (DEBURRING PROCESS)

ELIMINATE BURRS

END

STATOR AND STATOR SEALING METHOD

This application claims priority from Japanese Patent Application No. 2022-052601 filed on Mar. 28, 2022, the disclosure of which is herein incorporated by reference in its entirety.

FIELD OF THE INVENTION

The present invention relates to a stator having a stator core and coils sealed with resin, as well as to a method of sealing the stator.

BACKGROUND OF THE INVENTION

The sealing method is known of the stator whose stator core and coils are sealed with resin. One example is the stator sealing method described in JP2008260190A. In the stator sealing method, to prevent entrainment of air when injecting a sealing resin material into a mold, the sealing resin material is injected upward from the bottom side in the direction of a vertical line of the stator core placed within the mold, on the inner peripheral side of the stator core. In the stator sealing method of the prior art described in the above-identified Japanese patent application publication, when injecting the sealing resin material into the mold, the sealing resin material is injected downward from the top side in the vertical line direction of the stator core placed within the mold. The term "sealing" means hermetically sealing up the stator core and the coils that are objects to be sealed.

SUMMARY OF THE INVENTION

When the sealing resin material is injected from the top side or the bottom side in the direction of the vertical line of the stator core placed within the mold, the sealing resin material enters between a yoke and coil conductive wires and between the conductive wires, with the result that the coil conductive wires may be forced out to the tooth tip side (slot open side) in the radial direction of the stator core. In general, the tooth of the stator core tends to have a higher magnetic flux density at its tip side than at the root side. For this reason, when the coil conductive wires are forced out to the tip side of the tooth, the stator may experience an increased eddy-current loss.

The present invention was conceived in view of the above circumstances and an object of the present invention is to provide a stator and a stator sealing method, capable of suppressing increase in the eddy-current loss of the stator.

The object indicated above is achieved according to the following aspects of present invention.

According to a first aspect of the invention, there is provided a stator which comprises a cylindrical stator core centered on an axis, a coil arranged wound around a tooth disposed on the stator core, the tooth protrudes to one side in radial direction of the stator core, and a resin portion sealing up each of the stator core and the coil, (a) the resin portion has a gate mark that lies on one side with respect to the coil in the radial direction of the stator core, (b) the gate mark lies on outer side with respect to an end face of the stator core in the axial direction, the gate mark overlaps in position with the coil in the radial direction of the stator core.

According to a second aspect of the invention, in the stator core according to the first aspect of the invention, (a) the stator core comprises a plurality of the teeth, (b) the coils arranged wound around the plurality of teeth, respectively, are connected to each other by welding, on the outer side with respect to an one end face of the stator core in the axial direction, and (c) the gate mark lies on the outer side with respect to an other end face of the stator core in the axial direction.

According to a third aspect of the invention, in the stator core according to the first or second aspect of the invention, (a) the stator core comprises a plurality of the teeth and (b) the resin portion has the gate mark at positions where the gate mark overlaps, in the radial direction of the stator core, with each of the coils arranged wound around the plurality of teeth, respectively.

According to a fourth aspect of the invention, in the stator core according to any one of the first through third aspects of the invention, an insulating member that restrains the coil arranged wound around the tooth from moving to one side in the radial direction of the stator core.

According to a fifth aspect of the invention, there is provided a stator sealing method for sealing up a cylindrical stator core centered on an axis and a coil arranged wound around a tooth disposed on the stator core, the tooth protrudes to one side in radial direction of the stator core, the method comprises (a) a placement step of placing the coil arranged wound around the tooth and the stator core within a cavity of a mold, (b) an injection step of, subsequent to the placement step, in the mold, injecting a sealing resin material into the cavity from a gate positioned facing and overlapping with the coil in the radial direction of the stator core, on outer side with respect to an end face of the stator core in direction of the axis (c) a curing step of, subsequent to the injection step, curing the sealing resin material injected, (d) a removal step of, subsequent to the curing step, removing from the mold a molded product in which the stator core and the coil are each sealed up with a resin portion that is a cured result of the sealing resin material, and (e) a deburring step of, subsequent to the removal step, eliminating burrs formed on the resin portion corresponding in position to the gate.

According to a sixth aspect of the invention, in the method according to the fifth aspect of the invention, (a) the placement step includes placing within the cavity the stator core having a plurality of the teeth, and a coil group including the coils arranged wound around the plurality of teeth, respectively, the coils are connected to each other by welding on the outer side with respect to the one end face of the stator core in the axial direction, and (b) the injection step includes injecting the sealing resin material into the cavity from the gate lying on the outer side with respect to the other end face of the stator core in the axial direction.

According to a seventh aspect of the invention, in the method according to the fifth or sixth aspect of the invention, (a) the placement step includes placing within the cavity the stator core having a plurality of the teeth, and (b) the injection step includes injecting the sealing resin material into the cavity from the gate positioned overlapping, in the radial direction of the stator core, with each of the coils arranged wound around the plurality of teeth, respectively.

According to an eighth aspect of the invention, in the method according to any one of the fifth through seventh aspects of the invention, the placement step includes placing within the cavity an insulating member together with the stator core and the coil, the insulating member restraining the coil from moving to one side in the radial direction of the stator core.

According to the first aspect of the invention, (a) the resin portion has the burr mark lying on one side of the stator core in the radial direction, with respect to each of the coils, and (b) the burr mark lies overlapping with the coil in the radial direction, on the outer side of the other end face of the stator core in the axis direction. Since each of the coils is easily fixed to the resin portion while being pushed toward the yoke on the other side opposite to the one side of the stator core in the radial direction, facilitating suppression of increase in the eddy-current loss in the entire stator.

According to the second aspect of the invention, in the stator according to the first aspect of the invention, (a) the stator core comprises a plurality of the teeth, (b) the coils arranged wound around the plurality of teeth, respectively, are welded to each other on the outer side of the one end face of the stator core in the axis direction, and (c) the burr mark lies on the outer side of the other end face of the stator core in the axis direction. In case that the burr mark lies on the outer side of the other end face of the stator core as compared to the case where the burr mark lies on the outer side of the one end face of the stator core, the burr mark is apart from the portion where the coils are welded to each other. For this reason, a low level of stress is apt to act on the portion where the coils are welded to each other, achieving improved reliability in the electrical connection between the coils.

According to the third aspect of the invention, in the stator according to the first or the second aspect of the invention, (a) the stator core comprises a plurality of the teeth, and (b) the resin portion has the gate mark at positions where the gate mark overlaps, in the radial direction of the stator core, with each of the coils arranged wound around the plurality of teeth, respectively. Since the resin portion has the gate mark at positions where the gate mark overlaps with each of the coils in the radial direction of the stator core, the coils are easily fixed to the resin portion while being pushed to the yoke side that is the other side in the radial direction of the stator core, consequently facilitating suppression of increase in the eddy-current loss in the entire stator.

According to the fourth aspect of the invention, in the stator according to the stator in the first or second aspect of the invention, the stator further includes the insulating member that restrains the coils each arranged wound around each of the plurality of teeth from moving to the inner peripheral side in the radial direction. Since the coils are restrained from moving to the radially inner peripheral side by the insulating member, the coils are easily fixed to the resin portion while being pushed to the outer peripheral side in the radial direction, facilitating suppression of increase in the eddy-current loss in the stator.

According to the fifth aspect of the invention, the stator sealing method includes (a) the placement process of placing, within the cavity of the mold, the stator core and the coils arranged wound around the plurality of teeth, respectively, (b) the injection process, subsequent to the placement process, of injecting the sealing resin material into the cavity from the gates each positioned facing and overlapping in the radial direction with each of the coils, on the outer side with respect to the other end face of the stator core in the axis direction in the mold, (c) the curing process, subsequent to the injection process, of curing the sealing resin material injected, (d) the removal process, subsequent to the curing process, of removing from the mold the molded product whose portions to be sealed are each sealed up with the resin portion that is a cured result of the sealing resin material, and (e) the deburring process, subsequent to the removal process, of eliminating the burr 74 formed on the resin portion at a position corresponding in position to the gate. At the injection process, the coils are each pushed toward the yoke on the outer peripheral side opposite to the inner peripheral side in the radial direction. At the curing process, the coils are each fixed to the resin portion while being pushed to the outer peripheral side in the radial direction, consequently, facilitating suppression of increase in the eddy-current loss in the entire stator.

According to the sixth aspect of the invention, in the fifth aspect of the invention, the stator sealing method includes (a) in the placement process, the coil group and the stator core with the plurality of teeth are placed within the cavity, the coil group includes the plurality of coils each arranged wound around each of the plurality of teeth on the outer side of the one end face of the stator core in the axis direction, the coils being welded to each other, and (b) in the injection process, the sealing resin material is injected into the cavity from the gate positioned on the outer side of the other end face of the stator core in the axis direction. In case, at the injection process, that the gate positioned on the outer side of the other end face of the stator core as compared to the case where the gate positioned on the outer side of the one end face of the stator core, the position of injection of the sealing resin material from the gate is apart from the portion where the coils are welded to each other. For this reason, when the sealing resin material is injected in the injection process, a low level of stress is apt to act on the portion where the coils are welded to each other, achieving improved reliability in the electrical connection between the coils.

According to the seventh aspect of the invention, in the stator sealing method according to the fifth or sixth aspect of the invention, (a) in the placement process, the stator core with the plurality of teeth are placed within the cavity, (b) in the injection process, the sealing resin material is injected into the cavity from the gate each positioned facing and overlapping in the radial direction with each of the coils being arranged wound around each of the plurality of teeth. In the injection process, the resin material is injected from the gate which overlaps with the stator core with respect to each of the coils in the radial direction, the coils are easily fixed to the resin portion while being pushed to the yoke side that is the other side in the radial direction of the stator core, consequently facilitating suppression of increase in the eddy-current loss in the entire stator According to the eighth aspect of the invention, in the stator sealing method according to any one of the fifth through seventh aspects of the invention, the placement process includes placing within the cavity the insulating member restraining the coils from moving to the radially inner peripheral side, together with the stator core and the coils. For example, in the placement process, the coils are restrained from moving to the radially inner peripheral side by the insulating member. For this reason, in the injection process subsequent to the placement process, the coils are easily pushed to the yoke side that is the other side in the radial direction, facilitating suppression of increase in the eddy-current loss in the stator.

BRIEF DESCRIPTION OF THE DRAWINGS

FIG. 1 is a view explaining a schematic configuration of a stator of a rotating electrical machine according to an embodiment of the present invention.

DETAILED DESCRIPTION OF PREFERRED EMBODIMENTS

An embodiment of the present invention will now be described in detail with reference to the drawings. In the embodiment that will be described below, figures are simplified or transformed appropriately for ease of understanding and the dimension ratios, shapes, etc. of parts are not necessarily correctly drawn. Hereinafter, in this description, the phrases "direction parallel to an axis CL", "circumferential direction of stator core 20", and "radial direction of stator core 20" are referred to simply as "axis CL direction", "circumferential direction", and "radial direction", respectively.

Figure 1:
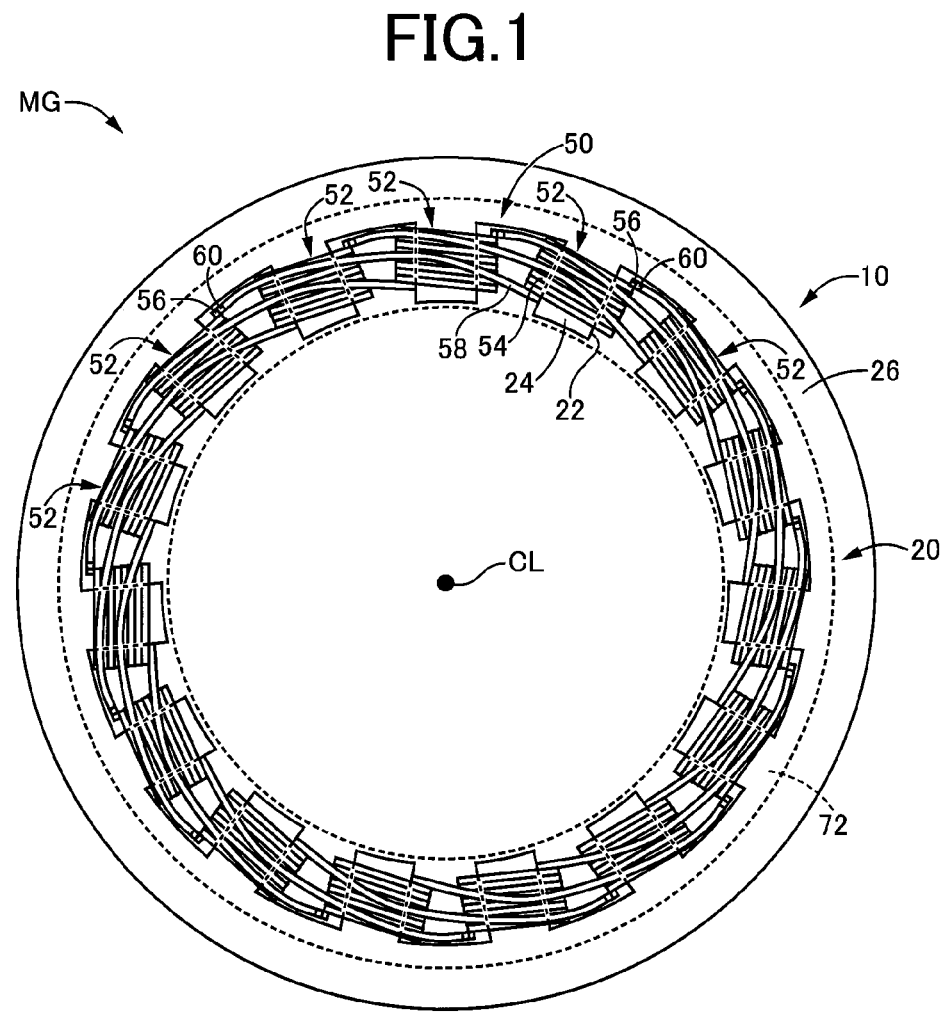
Figure 2:
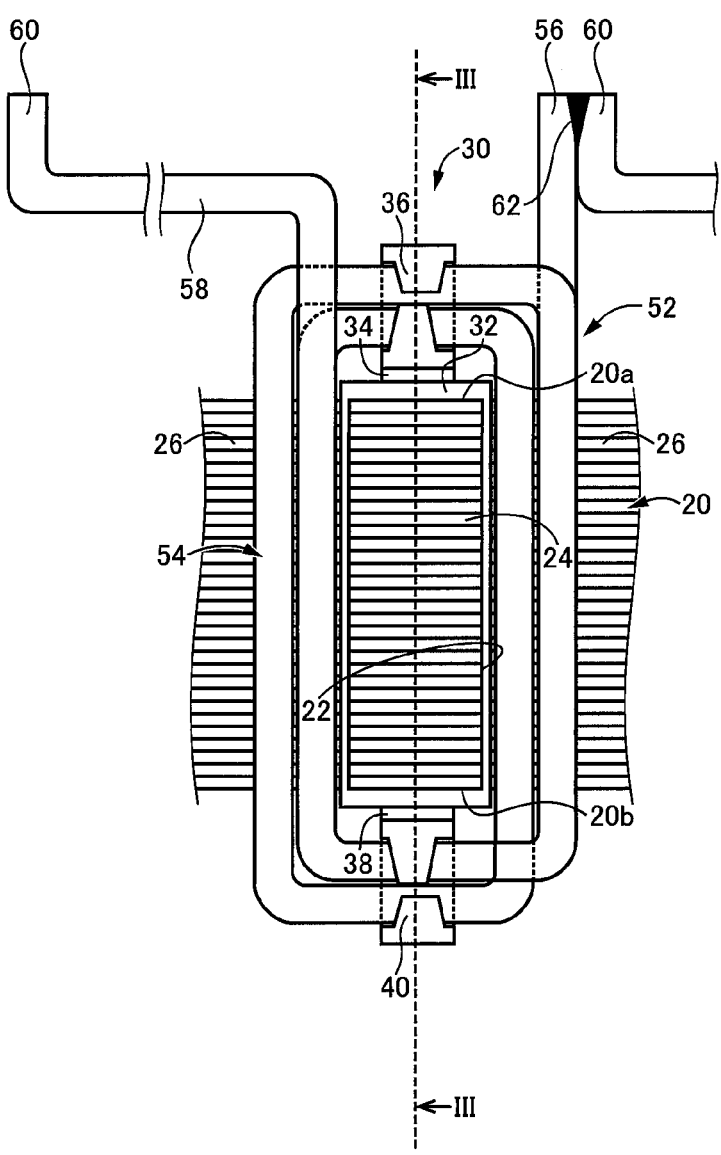
FIG. 2 is a view showing the state of a coil wound around a tooth through a slot of FIG. 1, unfolded circumferentially of the stator core and seen from the inner peripheral side toward the outer peripheral side thereof.
Figure 3:
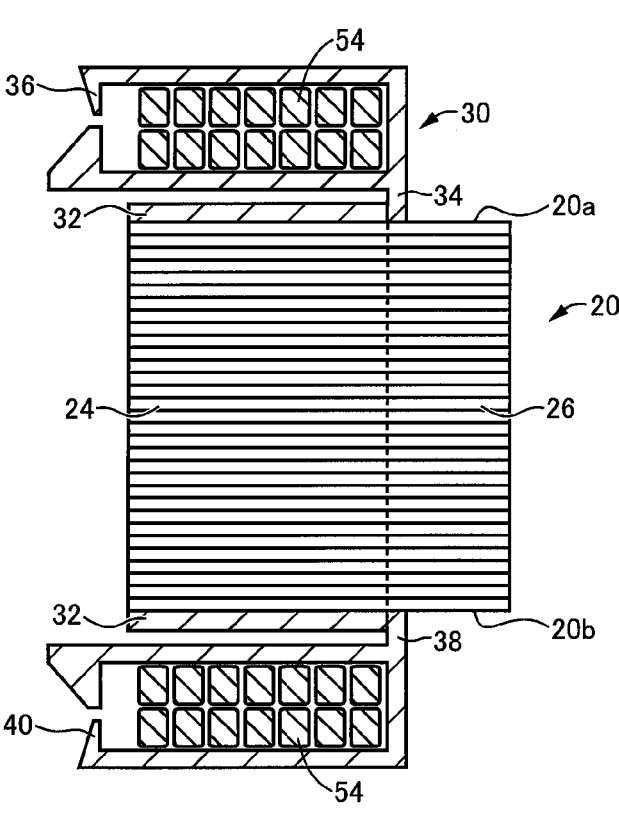
FIG. 3 is a view showing the stator core, the coil, and an insulating member taken along a cutting line III-III of FIG. 2, seen in the circumferential direction.

FIG. 1 is a view explaining a schematic configuration of a stator 10 of a rotating electrical machine MG according to the embodiment of the present invention. FIG. 1 is a view of a one end face 20a in the axis CL direction of the stator core 20 of the stator 10, seen from the axis CL direction. In FIG. 1, an insulating member 30 described later is not shown. FIG. 2 is a view showing the state of a coil 52 wound around a tooth 24 through a slot 22 of FIG. 1, unfolded circumferentially of the stator core 20 and seen from the inner peripheral side toward the outer peripheral side thereof. FIG. 3 is a view showing the stator core 20, the coil 52, and the insulating member 30 taken along a cutting line III-III of FIG. 2, seen in the circumferential direction. In FIGS. 2 and 3, one coil 52 is shown representatively.

The rotating electrical machine MG is a so-called motor generator that is a rotary electric machine mounted on a hybrid vehicle or an electric vehicle for example and having both the function as an electric motor (motor) and the function as an electric generator (generator). The rotating electrical machine MG is, for example, a drive source for running of a vehicle. The rotating electrical machine MG includes the stator 10 in the shape of a cylinder having the axis CL at its center and a rotor not shown arranged on the inner peripheral side of the stator 10. The rotor is rotatable by a rotating magnetic field that the stator 10 generates. The rotating electrical machine MG is of an inner rotor type.

The stator 10 includes the stator core 20, a coil group 50, the insulating member 30, and a resin portion 72. In FIG. 1, the coils 50 are concentratedly wound.

The stator core 20 is of a cylindrical shape whose center is the axis CL, formed from e.g. a plurality of laminated electromagnetic steel sheets. Preferably, the stator core 20 is circularly cylindrical, but its outer shape may be any cylinder without being limited to the circular cylinder. Similar to the stator core 20, the coil group 50 is of a cylindrical shape whose center is the axis CL. The inner peripheral surface of the cylindrical stator core 20 has a plurality of grooves i.e. slots 22 each having a depth toward the outer peripheral side in the radial direction and extending in the axis CL direction, the slots 22 being formed at equal angular intervals around the axis CL. That is, the slots 22 are disposed open to the inner peripheral side in the radial direction. Between the slots 22 adjacent to each other, there lie teeth 24 protruding toward the inner peripheral side in the radial direction and formed at equal angular intervals around the axis CL. A yoke 26 is a portion other than the teeth 24 of the stator core 20 that becomes a path of lines of magnetic force between the teeth 24 acting as electromagnets. The phrase "the inner peripheral side in the radial direction" is equivalent to "one side in the radial direction of the stator core 20" in the present invention.

The coil group 50 includes a plurality of coils 52 each wound around each of the plurality of teeth 24. As will be described later, the coil group 50 is formed by electrically connecting the plurality of coils 52 to each other by welding. The coil group 50 is, for example, a three-phase winding of U-phase, V-phase, and W-phase.

The coil 52 includes a winding portion 54, a leading end 56, a crossover line 58, and a trailing end 60. In the winding portion 54, a conductive wire is double-wound clockwise around the tooth 24 from the outer peripheral side i.e. the root side of the tooth 24 toward the inner peripheral side i.e. the tip side of the tooth 24. The leading end 56 is a tip extending from the outer peripheral end of the winding portion 54 outward of the one end face 20a of the stator core 20 in the axis CL direction. The term "outward" means outward when viewed from the inside of the stator core 20. The crossover line 58 is a portion bent in the circumferential direction from the inner peripheral end of the winding portion 54 and diagonally extending in the circumferential direction toward the outer peripheral side, on the outer side of the one end face 20a of the stator core 20. The trailing end 60 is a tip extending from the end, opposite to the winding portion 54, of the crossover line 58 and bent to the outer side of the stator core 20 in the axis CL direction. The leading end 56 and the trailing end 60 of the in-phase (e.g. U-phase, V-phase, or W-phase) coils 52 are electrically connected together by a weld portion 62.

The insulating member 30 includes a tooth housing portion 32, a first coupling portion 34, a first locking portion 36, a second coupling portion 38, and a second locking portion 40. For example, the insulating member 30 is integrally molded with resin. The tooth housing portion 32 has a cylindrical shape capable of housing the tooth 24.

The first locking portion 36 retains the winding portion 54 of the coil 52 at a portion of the winding portion 54 that protrudes from the one end face 20a of the stator core 20 toward the outer side in the axis CL direction, and restrains the conductive wire of the retained winding portion 54 from moving to the inner peripheral side in the radial direction. Specifically, the first locking portion 36 includes two plate-like portions extending in the radial direction and facing each other in the axis CL direction, the two plate-like portions being coupled together on the outer peripheral side and having, at their respective inner peripheral tips, respective locking claws extending facing each other. The two plate-like portions of the first locking portion 36 are each flexible in the axis CL direction.

The second locking portion 40 retains the winding portion 54 of the coil 52 at a portion of the winding portion 54 that protrudes from an other end face 20b of the stator core 20 toward the outer side in the axis CL direction, and restrains the conductive wire of the retained winding portion 54 from moving to the inner peripheral side in the radial direction. Specifically, the second locking portion 40 includes two plate-like portions extending in the radial direction and facing each other in the axis CL direction, the two plate-like portions being coupled together on the outer peripheral side and having, at their respective inner peripheral tips, respective locking claws extending facing each other. The two plate-like portions of the second locking portion 40 are each flexible in the axis CL direction.

The first coupling portion 34 couples together the outer peripheral side of the first locking portion 36 and the outer peripheral side of the tooth housing portion 32. The second coupling portion 38 couples together the outer peripheral side of the second locking portion 40 and the outer peripheral side of the tooth housing portion 32.

For example, the insulating member 30 is first thrust into the previously wound coil 52 from the outer peripheral side of the coil 52 toward the inner peripheral side thereof. Next, with the first locking portion 36 and the second locking portion 40 each retaining the winding portion 54, the insulating member 30 is placed such that its tooth housing portion 32 houses each of the teeth 24 of the stator core 20. This results in the state of FIG. 3. The leading end 56 and the trailing end 60 of the in-phase coils 52 are then welded to each other, resulting in the states shown in FIGS. 1 and 2.

The resin portion 72 seals the inner peripheral side, including a part of the yoke 26, of the one end 20a of the stator core 20 and the inner peripheral surface of the stator core 20. The resin portion 72 further seals the insulating member 30 holding the coil group 50 and the coils 52.

Figure 4:
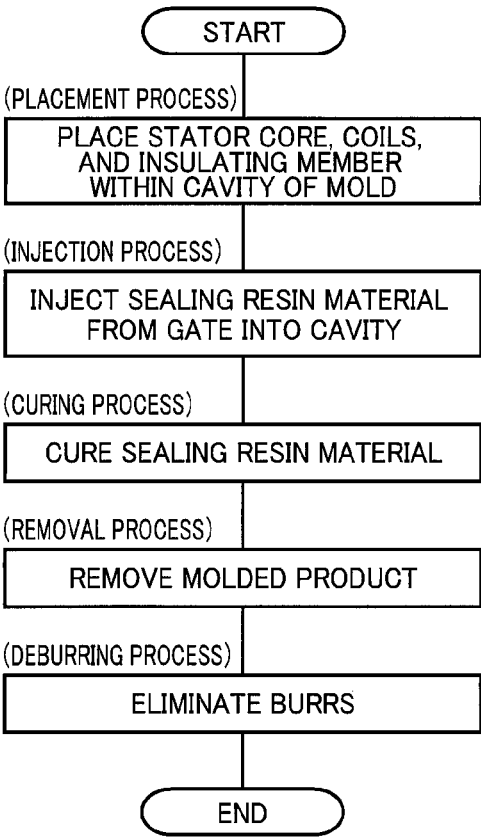
FIG. 4 is a process flowchart explaining a sealing method of the stator.
Figure 5:
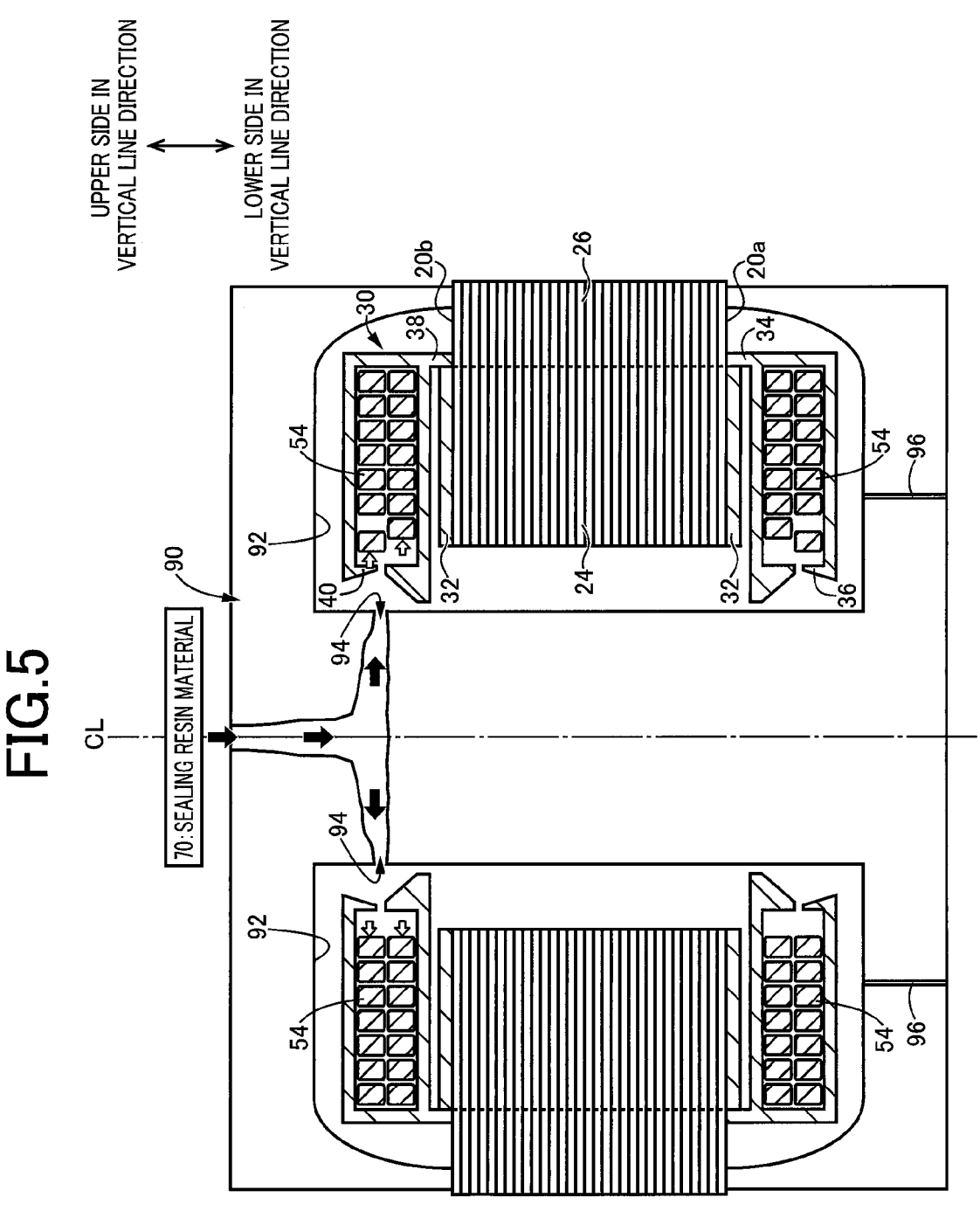
FIG. 5 is a view explaining a placement process and an injection process shown in FIG. 4.
Figure 6:
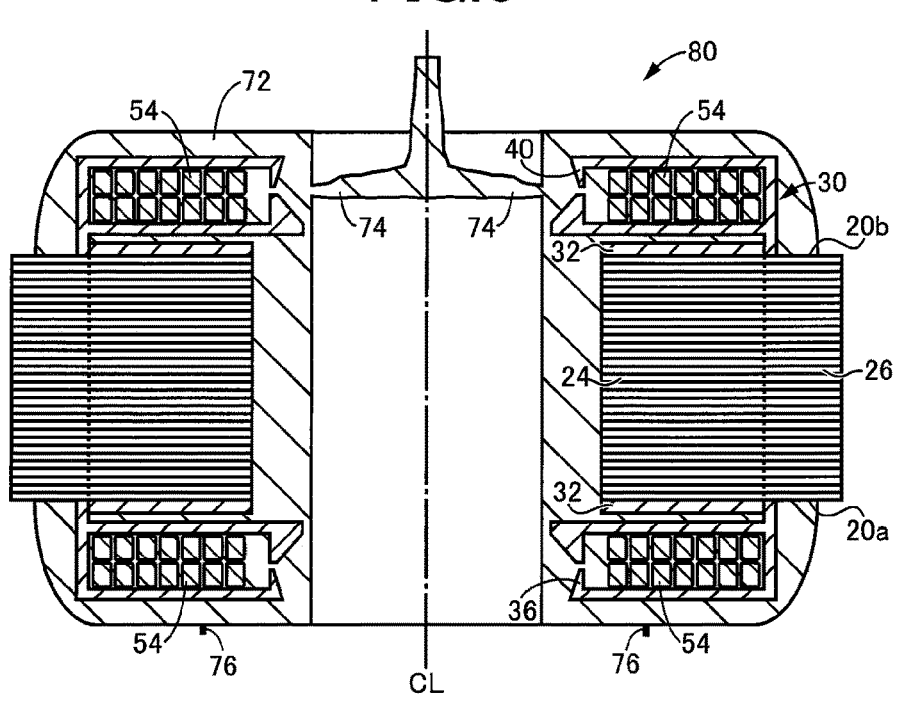
FIG. 6 is a view explaining a removal process shown in FIG. 4 and is a view showing the state of a molded product removed from a mold.
Figure 7:
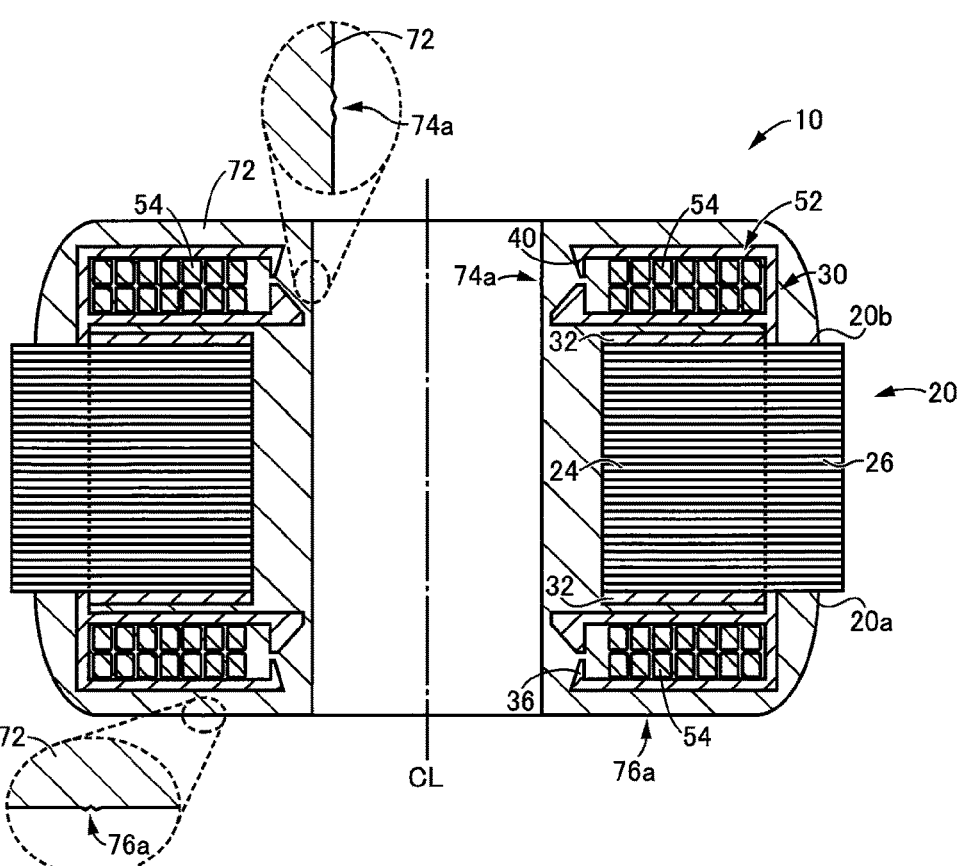
FIG. 7 is a view explaining a deburring process shown in FIG. 4 and is a view showing the state of the molded product with burrs eliminated.

FIG. 4 is a process flowchart explaining a sealing method of the stator 10. FIG. 5 is a view explaining a placement process and an injection process shown in FIG. 4. FIG. 6 is a view explaining a removal process shown in FIG. 4 and is a view showing the state of a molded product 80 removed from a mold 90. FIG. 7 is a view explaining a deburring process shown in FIG. 4 and is a view showing the state of the molded product 80 with burrs 74 and 78 eliminated.

As shown in FIG. 4, a process flow of the sealing method of the stator 10 includes the placement process, the injection process, a curing process, the removal process, and the deburring process.

First, as shown in FIG. 5, in the placement process, objects to be sealed are placed within a cavity 92 of the mold 90 at a predetermined position specified in advance. The mold 90 is composed of a plurality of members and has the cavity 92 i.e. a hollow space formed within the mold 90 by combining those members. The objects to be sealed include the stator core 20, the coil group 50 including the coils 52 each arranged wound around each of the teeth 24 and electrically connected to each other by welding, and the insulating member 30 holding the coils 52. Within the cavity 92, the other end face 20b of the stator core 20 is placed on the upper side in the vertical line direction and the one end 20a is placed on the lower side in the vertical line direction. As a result, the weld portions 62 of the coil group 50 are placed on the lower side in the vertical line direction.

In this embodiment, when the objects to be sealed are placed at the predetermined positions, within the cavity 92 there are accommodated the inner peripheral side, including a part of the yoke 26, of the other end face 20b of the stator core 20, the inner peripheral side, including a part of the yoke 26, of the one end face 20a, and the inner peripheral surface of the stator core 20. The insulating member 30 holding the coil group 50 and the coils 52 is also accommodated within the cavity 92. In other words, the cavity 92 does not accommodate therewithin the outer peripheral side of the yoke 26 at the other end face 20b of the stator core 20, the outer peripheral side of the yoke 26 at the one end face 20a of the stator core 20, and the outer peripheral surface of the stator core 20. Accommodated within the cavity 92 are portions to be sealed specified in advance, of the objects to be sealed.

Although not shown in FIG. 5, a power line is arranged extending to the outside of the cavity 92. The power line is a wiring for electrical connection between the end of each of the phases of the coil group 50 and the drive source for driving the rotating electrical machine MG such as an inverter not shown.

In the placement process, the object to be sealed including the coils 52 is moved or turned upside down. For this reason, the conductive wire of the winding portion 54 of the coil 52 may be moved to the inner peripheral side. FIG. 5 shows the state on the right-hand side where the innermost conductive wire of the winding portion 54 has moved to the inner peripheral side and the state on the left-hand side where the conductive wire of the winding portion 54 has not moved to the inner peripheral side.

After the placement process, as shown in FIG. 5, at the injection process, a sealing resin material 70 is injected from a gate 94 disposed on the mold 90 into the cavity 92. The gate 94 is a port for injection of the sealing resin material 70 into the cavity 92. The gate 94 is disposed at a position facing and radially overlapping the coil 52, on the outer side of the other end face 20b of the stator core 20 in the axis CL direction. A plurality of gates 94 are each disposed at a position radially overlapping the winding portion 54 of each of all the coils 52. For example, the gates 94 are disposed, at equal angular intervals around the axis CL, facing the corresponding winding portions 54.

The sealing resin material 70 injected from the gate 94 advances, as indicated by open arrows in FIG. 5, so as to push to the outer peripheral side the conductive wire on the inner peripheral side of the winding portion 54 retained by the second locking portion 40. That is, the sealing resin material 70 pushes the conductive wire on the inner peripheral side to the outer peripheral side before the sealing resin material 70 enters between the conductive wire of the winding portion 54 of the coil 52 and the yoke 26 and between the conductive wires of the winding portion 54. This causes the conductive wire of the winding portion 54 retained by the second locking portion 40 to move to the outer peripheral side. In liaison with the movement to the outer peripheral side of the conductive wire of the winding portion 54 retained by the second locking portion 40, the conductive wire of the winding portion 54 retained by the first locking portion 36 also moves to the outer peripheral side. Air within the cavity 92 and gas generated from the sealing resin material 70 are discharged from a vent pin 96 disposed within the cavity 92 at its lower part in the vertical direction. For example, a plurality of vent pins 96 are disposed at equal angular intervals around the axis CL. Since in general, discharge of gas is easier compared to injection of the sealing resin material 70 that is a liquid, the gate 94 is larger in opening area than the vent pin 96.

Posterior to the injection process, at the curing process, the injected sealing resin material 70 is cured. For example, in case that the sealing resin material 70 is a thermosetting resin, heat is applied to cure the sealing resin material 70. The molded product 80 is thus formed in which the resin portion 72 as a cured result of the sealing resin material 70 seals up each of the inner peripheral side of the other end face 20b, the inner peripheral side of the one end face 20a, and the inner peripheral surface, of the stator core 20, coil group 50, and the insulating member 30. When the sealing resin material 70 becomes cured, the conductive wire of the winding portion 54 moved to the outer peripheral side at the injection process is fixed at that position (see FIGS. 6 and 7).

Posterior to the curing process, as shown in FIG. 6, at the removal process, the molded product 80 is removed from the mold 90. The molded product 80 is of a cylindrical shape whose center is the axis CL. The resin portion 72 of the molded product 80 has a burr 74 formed corresponding in position to the gate 94 and a burr 76 formed corresponding in position to the vent pin 96. The burrs 74 and 76 are excess portions protruding from the resin portion 72.

Subsequent to the removal process, as shown in FIG. 7, at the deburring process, there are each eliminated the burr 74 formed on the resin portion 72 at a position corresponding to the position of the gate 94 and the burr 76 formed on the resin portion 72 at a position corresponding to the position of the vent pin 96. The elimination of the burr 74 leaves a burr mark 74a behind on the resin portion 72, and the elimination of the burr 76 leaves a burr mark 76a behind on the resin portion 72. The burr marks 74a and 76a are unevennesses of surfaces on which they are formed. Corresponding to the position of the gate 94, the burr mark 74a lies on the inner peripheral side of the coil 52 in the radial direction; lies on the outer side of the other end face 20b of the stator core 20 in the axis CL direction; and lies at a position radially overlapping the coil 52. The burr mark 74a is equivalent to "gate mark" of the present invention and the other end face 20b is equivalent to "the other end face of the stator core" and "the end face of the stator core" of the present invention.

When the deburring process terminates, the process flow of the sealing method of the stator 10 comes to an end.

According to this embodiment, (a) the stator core 20 comprises a plurality of the teeth 24, (b) the resin portion 72 has the burr mark 74a lying on the radially inner peripheral side of each of the coils 52 arranged wound around the plurality of teeth 24, and (c) the burr mark 74a lies overlapping with the coil 52 in the radial direction, on the outer side of the other end face 20b of the stator core 20 in the axis CL direction. Since each of the coils 52 is easily fixed to the resin portion 72 while being pushed toward the yoke 26 on the outer peripheral side opposite to the inner peripheral side in the radial direction, facilitating suppression of increase in the eddy-current loss in the entire stator 10.

According to this embodiment, (a) the stator core 20 comprises a plurality of the teeth 24, (b) the coils 52 arranged wound around the plurality of teeth 24, respectively, are welded to each other on the outer side of the one end face 20a of the stator core 20 in the axis CL direction, and (c) the burr mark 74a lies on the outer side of the other end face 20b of the stator core 20 in the axis CL direction. In case that the burr mark 74a lies on the outer side of the other end face 20b of the stator core 20 as compared to the case where the burr mark 74a lies on the outer side of the one end face 20a of the stator core 20, the burr mark 74a is apart from the portion where the coils 52 are welded to each other. For this reason, a low level of stress is apt to act on the portion where the coils 52 are welded to each other, achieving improved reliability in the electrical connection between the coils 52.

According to this embodiment, the stator 10 further includes the insulating member 30 that restrains the coils 52 each arranged wound around each of the plurality of teeth from moving to the inner peripheral side in the radial direction. Since the coils 52 are restrained from moving to the radially inner peripheral side by the insulating member 30, the coils 52 are easily fixed to the resin portion 72 while being pushed to the outer peripheral side in the radial direction, facilitating suppression of increase in the eddy-current loss in the stator 10.

According to this embodiment, the process flow includes (a) the placement process of placing, within the cavity 92 of the mold 90, the stator core 20 and the coils 52 arranged wound around the plurality of teeth 24, respectively, (b) the injection process, subsequent to the placement process, of injecting the sealing resin material 70 into the cavity 92 from the gates 94 each positioned facing and overlapping in the radial direction with each of the coils 52, on the outer side with respect to the other end face 20b of the stator core 20 in the axis CL direction in the mold 90, (c) the curing process, subsequent to the injection process, of curing the sealing resin material 70 injected, (d) the removal process, subsequent to the curing process, of removing from the mold 90 the molded product 80 whose portions to be sealed are each sealed up with the resin portion 72 that is a cured result of the sealing resin material 70, and (e) the deburring process, subsequent to the removal process, of eliminating the burr 74 formed on the resin portion 72 at a position corresponding in position to the gate 94. At the injection process, the coils 52 are each pushed toward the yoke 26 on the outer peripheral side opposite to the inner peripheral side in the radial direction. At the curing process, the coils 52 are each fixed to the resin portion 72 while being pushed to the outer peripheral side in the radial direction, consequently, facilitating suppression of increase in the eddy-current loss in the entire stator 10.

According to this embodiment, (a) in the placement process, the coil group 50 and the stator core 20 with the plurality of teeth 24 are placed within the cavity 92, the coil group 50 including the plurality of coils 52 each arranged wound around each of the plurality of teeth 24 on the outer side of the one end face 20a of the stator core 20 in the axis CL direction, the coils 52 being welded to each other, and (b) in the injection process, the sealing resin material 70 is injected into the cavity 92 from the gate 94 positioned on the outer side of the other end face 20b of the stator core 20 in the axis CL direction. In case, at the injection process, that the gate 94 positioned on the outer side of the other end face 20b of the stator core 20 as compared to the case where the gate 94 positioned on the outer side of the one end face 20a of the stator core 20, the position of injection of the sealing resin material 70 from the gate 94 is apart from the portion where the coils 52 are welded to each other. For this reason, when the sealing resin material 70 is injected in the injection process, a low level of stress is apt to act on the portion where the coils 52 are welded to each other, achieving improved reliability in the electrical connection between the coils 52.

According to this embodiment, the placement process includes placing within the cavity 92 the insulating member 30 restraining the coils 52 from moving to the radially inner peripheral side, together with the stator core 20 and the coils 52. For example, in the placement process, the coils 52 are restrained from moving to the radially inner peripheral side by the insulating member 30. For this reason, in the injection process subsequent to the placement process, the coils 52 are easily pushed to the yoke 26 side i.e. the outer peripheral side in the radial direction, facilitating suppression of increase in the eddy-current loss in the stator 10.

Although the embodiment of the present invention has hereinbefore been described in detail with reference to the drawings, the present invention is appliable to other modes.

Although in the above embodiment the stator 10 includes the insulating member 30, the stator 10 of the present invention may be a mode not including the insulating member 30.

Although the above embodiment employs the mode where at the injection process the sealing resin material 70 is injected into the cavity 92 from the gate 94 lying on the outer side of the other end face 20b of the stator core 20 in the axis CL direction, this is not limitative. For example, the mode may be employed where at the injection process the sealing resin material 70 is injected into the cavity 92 from the gate 94 positioned on the outer side of the one end face 20a of the stator core 20 in the axis CL direction.

Although the above embodiment employs the mode where the resin portion 72 has the burr mark 74a at a position overlapping, radially of the stator core 20, with each of the coils 52 arranged wound around the plurality of teeth 24, the present invention is not limited to the mode. For example, the mode may be employed where the resin portion 72 has the burr mark 74a at a position overlapping, radially of the stator core 20, with at least one of the coils 52 arranged wound around the plurality of teeth 24. That is, the mode may be such that at the injection process the sealing resin material 70 is injected into the cavity 92 from the gate 94 positioned facing and overlapping, radially of the stator core 20, with at least one of the coils 52 in the mold 90. Even in such a case, the at least one coil 52 is easy to fix to the resin portion 72 while being pushed to the yoke 26 side i.e. the other side of the stator core 20 in the radial direction, facilitating increase in the eddy-current loss of the stator 10.

Although in the above embodiment, previously specified portions to be sealed, of the objects to be sealed are accommodated within the cavity 92 at the placement process, the portions to be sealed each only need to include at least a part of the stator core 20 and at least a part of the coil 52. For example, as in the above embodiment, the portion to be sealed of the coil 52 may be the entire coil 52 or may be a part of the coil 52. As in the above embodiment, the portion to be sealed of the stator core 20 may be a part of the stator core 20 or may be the entire stator core 20.

Although in the above embodiment the coil 52 is concentratedly wound, the present invention is applicable also to a distributed winding stator 10 in which one coil is wound across several teeth 24.

Although in the above embodiment the rotating electrical machine MG is of the inner rotor type, it may be of an outer rotor type. In case that the rotating electrical machine MG is of the outer rotor type, the "inner peripheral side" and "outer peripheral side" in the radial direction and the "inner peripheral surface" and "outer peripheral surface" of the stator core 20 in the embodiment can be read, respectively, as the "inner peripheral side" and "outer peripheral side" in the radial direction and the "outer peripheral surface" and "inner peripheral surface" of the stator core 20.

Although in the above embodiment the rotating electrical machine MG is the motor generator acting as the drive source for vehicle running, the present invention is not limited to this mode. For example, the rotating electrical machine MG may be an electric motor for vehicle running having only the electric motor function but not having the generator function, or may be a generator for regeneration having only the generator function but not having the electric motor function.

The above is a mere Example of the present invention, and the present invention can be carried out in modes variously altered or modified on the basis of knowledge of those skilled in the art without departing from the spirit of the present invention.

NOMENCLATURE OF ELEMENTS

10: stator
20: stator core
20a: one end face
20b: other end face (end face)
24: tooth
30: insulating member
50: coil group
52: coil
70: sealing resin material
72: resin portion
74a: burr mark (gate mark)
80: molded product
90: mold
92: cavity
94: gate
CL: axis

The invention claimed is:

1. A stator comprising:
a cylindrical stator core centered on an axis;
a coil arranged wound around a tooth disposed on the stator core, the tooth protruding to one side in a radial direction of the stator core;
a resin portion sealing up each of the stator core and the coil; and
an insulating member that restrains the coil, which is wound around the tooth, from moving to one side in the radial direction of the stator core,
the resin portion having a gate mark that lies on one side with respect to the coil in the radial direction of the stator core,
the gate mark lying on an outer side with respect to an end face of the stator core in an axial direction of the stator core, the gate mark overlapping in position with the coil in the radial direction of the stator core, wherein
the insulating member includes a locking portion which retains the coil and which restrains the coil from moving to an inner peripheral side in the radial direction, and
the gate mark of the resin portion and the locking portion of the insulating member overlap in position in the radial direction of the stator core.

2. The stator of claim 1, wherein
the stator core comprises a plurality of the teeth, wherein
the coils arranged wound around the plurality of teeth, respectively, are connected to each other by welding, on the outer side with respect to one end face of the stator core in the axial direction, and wherein
the gate mark lies on the outer side with respect to other end face of the stator core in the axial direction.

3. The stator of claim 1, wherein
the stator core comprises a plurality of the teeth, and wherein
the resin portion has the gate mark at positions where the gate mark overlaps, in the radial direction of the stator core, with each of the coils arranged wound around the plurality of teeth, respectively.

4. The stator of claim 1, wherein
the stator core comprises a plurality of the teeth, and wherein
the resin portion has the gate mark at positions where the gate mark overlaps, in the radial direction of the stator core, with at least one of the coils that is wound around the plurality of teeth, respectively.

5. The stator of claim 1, wherein the gate mark of the resin portion is located axially outward of the end face of the stator core and radially inward of the coil so as to overlap with the coil in the radial direction of the stator core.

6. The stator according to claim 1, wherein the gate mark lies in a position, which is located on the outer side of the end face of the stator core in the axial direction of the stator core, and which overlaps with the coil in the radial direction of the stator core.

* * * * *